(12) United States Patent
Nishimurota

(10) Patent No.: US 9,581,196 B2
(45) Date of Patent: Feb. 28, 2017

(54) SLIDING MEMBER

(71) Applicant: OILES CORPORATION, Tokyo (JP)

(72) Inventor: Shusaku Nishimurota, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 5 days.

(21) Appl. No.: 14/412,920

(22) PCT Filed: Jul. 8, 2013

(86) PCT No.: PCT/JP2013/068617
§ 371 (c)(1),
(2) Date: Jan. 5, 2015

(87) PCT Pub. No.: WO2014/013900
PCT Pub. Date: Jan. 23, 2014

(65) Prior Publication Data
US 2015/0152917 A1    Jun. 4, 2015

(30) Foreign Application Priority Data

Jul. 19, 2012   (JP) ................................ 2012-160878

(51) Int. Cl.
*F16C 33/18*      (2006.01)
*F16C 33/20*      (2006.01)
(Continued)

(52) U.S. Cl.
CPC ........... *F16C 33/201* (2013.01); *D04H 1/435* (2013.01); *D04H 1/488* (2013.01); *D04H 1/49* (2013.01);
(Continued)

(58) Field of Classification Search
CPC .......... D04H 1/435; D04H 1/488; D04H 1/49; D04H 1/54; D04H 1/587; D06M 15/41
See application file for complete search history.

(56) References Cited

U.S. PATENT DOCUMENTS 3,480,547 A    11/1969  Dyk
6,524,979 B1    2/2003  Lorenz et al.
(Continued)

FOREIGN PATENT DOCUMENTS

CN    1608177    4/2005
CN    1816699    8/2006
(Continued)

OTHER PUBLICATIONS http://www.porex.com/technologies/materials/porous-polymer-fibers/pet-pet-fiber/ no date.*
(Continued)

*Primary Examiner* — Arti Singh-Pandey
(74) *Attorney, Agent, or Firm* — Nixon & Vanderhye P.C.

(57) ABSTRACT

A sliding member having more improved wear resistance is provided at a low cost. A sliding member is provided with: a substrate which is made of a nonwoven fabric; and a base resin which includes a phenol resin and which is impregnated into the substrate. The nonwoven fabric is preferably a bonded nonwoven fabric which is produced by a thermal bonding method, a binder method or the like and which has a strength that can tolerate the tension applied to the substrate in the step for producing the sliding member. It is preferable that the nonwoven fabric is made of a polyethylene terephthalate (PET) fiber which exhibits a high affinity for the phenol resin. Further, it is preferable that the phenol resin contains a chelating agent which can increase sites of crosslink with hydroxyl groups of the phenol resin.

10 Claims, 5 Drawing Sheets

(51) Int. Cl.
*D04H 1/54* (2012.01)
*D06M 15/41* (2006.01)
*D04H 1/435* (2012.01)
*D04H 1/587* (2012.01)
*D04H 1/488* (2012.01)
*D04H 1/49* (2012.01)

(52) U.S. Cl.
CPC .............. *D04H 1/54* (2013.01); *D04H 1/587* (2013.01); *D06M 15/41* (2013.01); *F16C 33/18* (2013.01); *F16C 33/208* (2013.01); *F16C 2208/02* (2013.01); *F16C 2208/82* (2013.01); *F16C 2208/90* (2013.01)

(56) References Cited

U.S. PATENT DOCUMENTS

| | | | |
|---|---|---|---|
| 2005/0015988 A1 | 1/2005 | Murakami et al. | |
| 2006/0162163 A1 | 7/2006 | Watanabe et al. | |
| 2012/0043272 A1 | 2/2012 | Yoshida et al. | |

FOREIGN PATENT DOCUMENTS

| | | |
|---|---|---|
| CN | 102132053 | 7/2011 |
| DE | 21 40 917 | 3/1973 |
| DE | 25 10 599 | 10/1975 |
| EP | 0 450 488 | 10/1991 |
| GB | 2 272 707 | 5/1994 |
| JP | 5-133421 | 5/1993 |
| JP | 6-184494 | 7/1994 |
| JP | 9-194626 | 7/1997 |
| JP | 9-279451 | 10/1997 |
| JP | 10-95859 | 4/1998 |
| JP | 2000-154824 | 6/2000 |
| JP | 2003-103677 | 4/2003 |
| JP | 2005-105434 | 4/2005 |
| JP | 2010-120992 | 6/2010 |
| JP | 2012-81389 | 4/2012 |
| JP | 2012-130575 | 7/2012 |
| WO | WO 2010/126113 | 11/2010 |

OTHER PUBLICATIONS

International Search Report for PCT/JP2013/068617, mailed Oct. 8, 2013.
Partial Supplementary European Search Report issued in EP App. No. 13820091.0 dated Mar. 3, 2016.
Chinese Search Resort issued in App. No. 201380031866.2 dated Sep. 1, 2016 (w/ translation).

* cited by examiner

Sliding Member

This application is the U.S. national phase of International Application No. PCT/JP2013/068617, filed Jul. 8, 2013, which designated the U.S. and claims priority to Japan Application No. 2012-160878, filed Jul. 19, 2012, the entire contents of each of which are hereby incorporated by reference

TECHNICAL FIELD

The present invention relates to a sliding member suitable for a sliding layer of a sliding bearing or the like.

BACKGROUND ART

PTL 1 discloses a sliding bearing which can maintain low friction without lubrication over a long period, against use at high load.

The sliding bearing is constructed by using a metal plate with a porous metal powder sintered layer formed on the surface as a backing material and by forming a sliding layer on the porous metal powder sintered layer of the backing material. The sliding layer is formed in the following procedures.

As a base resin of the sliding layer, a phenol resin is applied in a predetermined thickness onto the porous metal powder sintered layer of the backing material. A woven fabric is arranged thereupon as a substrate of the sliding layer. Then, by applying thermally curing to the phenol resin, the sliding layer is formed and is bonded to the porous metal powder sintered layer. Here, the woven fabric is made by twill-weaving or satin-weaving polytetrafluoroethylene (hereinafter referred to as PTFE) fibers and polyamide (hereinafter referred to as PA) fibers. The PTFE fibers are lubricant resin fibers, and the PA fibers are reinforced resin fibers with high adhesiveness to the phenol resin.

CITATION LIST

Patent Literature

[PTL 1] JP 2000-154824 A

SUMMARY OF INVENTION

Technical Problem

Since a step of making twist yarn from the fibers and a step of weaving the fabric from the twist yarn are required at least until the completion of the woven fabric, the production cost is increased.

Moreover, the PTFE fibers are relatively expensive, and is inferior in adhesiveness to the phenol resin or the like which is used as the base resin, because of its superior lubricating properties. Therefore, in the sliding bearing described in the PTL 1, the woven fabric in which the PA fibers and the PTFE fibers are woven is used as the substrate of the sliding layer. The PA fibers have high adhesiveness to the phenol resin, but are also relatively expensive.

As such, the sliding bearing described in the PTL 1 cannot be made at a low cost because of increasing of the production cost of the substrate of the sliding layer.

Moreover, the phenol resin has high moisture absorbency. Therefore, such as in the sliding bearing described in the PTL 1, if the phenol resin is used as the base resin, the bearing swells under high moisture environment by moisture absorption of the phenol resin used as the base resin of the sliding layer. As a result, the dimension is changed and an appropriate clearance (bearing clearance) between a sliding surface of the bearing and an opposite shaft cannot be maintained, so that desired performance may not be maintained.

The present invention has been made considering the above circumstances. An object of the present invention is to provide a sliding member capable of maintaining satisfactory sliding properties over a long period, at a lower cost. Moreover, another object of the present invention is to provide a sliding member capable of maintaining the satisfactory sliding properties over a long period by minimizing the dimensional changes caused by the moisture absorption or the like as much as possible, in the case that a phenol resin is used as a base material under high moisture environment.

Solution to Problem

To solve the above problems, in one aspect of the present invention, a nonwoven fabric is used as the substrate of the sliding member. Depending on a production method of the sliding member, it is preferable that the nonwoven fabric has strength enough to tolerate tension applied in steps for producing the sliding member. For example, the nonwoven fabric made by a thermal bonding method in which fibers are melted with heat and adhered, and the nonwoven fabric made by a binder method in which the fibers are adhered with a binder (chemical bond) have strength enough to tolerate tension applied in steps for producing the sliding member. Moreover, if the nonwoven fabric made by the thermal bonding method is used, it is preferable that fused bonding points between the fibers are not formed into films.

In the nonwoven fabric in which fused bonding points between the fibers are formed into films, the fused bonding points are smoothed. By this, adhesion between the nonwoven fabric as the substrate and the base resin is decreased and consequently the base resin is likely to peel off the nonwoven fabric. Thus, the sliding properties such as wear resistance and durability may be decreased by the problems on the strength. Therefore, by using the nonwoven fabric in which the fused bonding points between the fibers are not formed into films, an anchor effect between the substrate and the base resin is enhanced, so that it prevents the base resin separating from the substrate. Thus, the sliding properties such as wear resistance and durability are improved. Moreover, it is preferable that the nonwoven fabric is made from low-cost polyethylene terephthalate (hereinafter referred to as PET) fibers.

Furthermore, in another aspect of the present invention, as the base resin of the sliding member, a phenol resin containing a chelating agent is used. Here, for example, an organic titanium compound such as titanium chelate, titanium alkoxide and titanium acylate, an organic zirconium compound such as zirconium chelate, zirconium alkoxide and zirconium acylate, which can increase crosslinking points with hydroxyl groups of the phenol resin, is used for the chelating agent.

Advantageous Effects of Invention

Since the nonwoven fabric is made by adhering or entangling the fibers and it is not necessary to make the twist yarn from the fibers for weaving the fabric, the production cost is lower than that of the woven fabric. Moreover, if the woven fabric is used as the substrate, the base resin hardly penetrates into a center of the twist yarn constituting the woven fabric, so that the base resin and the substrate cannot be firmly adhered together. In contrast, the nonwoven fabric has no stitches and the fibers uniformly dispersed in the nonwoven fabric. Therefore, each fiber becomes entangled in the base resin, so that the sliding properties such as wear resistance and durability are improved by improving adhesiveness between the substrate and the base resin and the strength of the sliding member. Furthermore, unlike the case that the woven fabric is used, fuzz of the twist yarn does not occur after processing. Therefore, a surface of the sliding member can be more smoothed, so that fluid lubrication is facilitated and the sliding properties in the liquid such as under water environment are also improved. These effects become more remarkable by using the nonwoven fabric in which the fused bonding points are not formed into films. Therefore, according to one aspect of the present invention, by using the nonwoven fabric as the substrate of the sliding member, the sliding member which can keep sliding properties including low friction properties, wear resistance and durability over a long period can be provided at a lower cost, in comparison with the case that the woven fabric is used.

According to another aspect of the present invention, by using the phenol resin as the base resin of the sliding member and by adding the chelating agent, which can increase the crosslinking points with the hydroxyl groups of the phenol resin, to the phenol resin, hardness is improved because of increase of the crosslinking points, and also adhesiveness between the PET fiber and the phenol resin is improved. Moreover, water repellency becomes higher because of decrease in the hydroxyl groups, so that the dimensional changes caused by the moisture absorption of the phenol resin under high moisture environment can be suppressed. Therefore, the sliding member which can keep sliding properties including low friction properties, wear resistance and durability over a long period even under high moisture environment can be provided.

DESCRIPTION OF EMBODIMENTS

Hereinafter, one embodiment of the present invention will be described.

Figure 1:
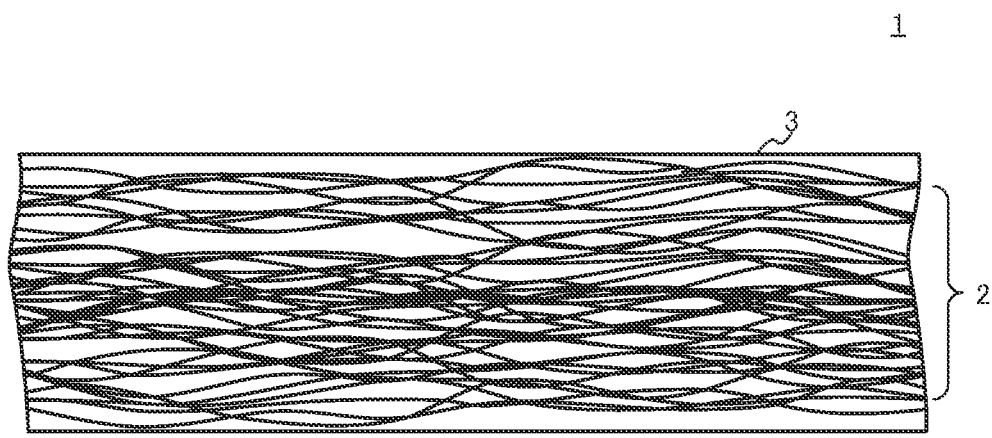
FIG. 1 is a schematic diagram of sectional structure of a sliding member 1 according to one embodiment of the present invention.

FIG. 1 is a schematic diagram of sectional structure of a sliding member 1 according to the present embodiment.

The sliding member 1 according to the present embodiment is used, for example in a sliding bearing, as a prepreg constituting a sliding layer formed on a backing material such as a resin plate having a glass fiber as a substrate or a metal plate. As shown in the figure, the sliding member 1 according to the present embodiment comprises a sheet-like substrate 2 and a base resin 3 impregnated into the substrate 2.

A nonwoven fabric is used as the substrate 2. Since the nonwoven fabric is made by adhering or entangling fibers, the production cost is lower than that of a woven fabric in which it is necessary to make twist yarn from fibers and then to weave the fabric from the twist yarn. Moreover, since the nonwoven fabric has no stitches and has the fibers uniformly dispersed, a surface of the sliding member 1 can be more smoothed than the woven fabric. Therefore, fluid lubrication is facilitated and sliding properties of the sliding member 1 are improved. Moreover, if the woven fabric is used as the substrate 2, the base resin 3 may not penetrate into a center of the twist yarn constituting the woven fabric. Conversely, if the nonwoven fabric with the fibers uniformly dispersed is used as the substrate 2, a contact area between the substrate 2 and the base resin 3 is increased so that adhesiveness between the substrate 2 and the base resin 3 is improved.

Depending on a production method of the sliding member, it is preferable that the nonwoven fabric used as the substrate 2 has strength enough to tolerate tension applied in steps for producing the sliding member 1 as described below. For example, the nonwoven fabric made by a thermal bonding method in which the fibers are melted with heat and adhered, and the nonwoven fabric made by a binder method in which the fibers are adhered with a binder (chemical bond) have strength enough to tolerate tension applied in steps for producing the sliding member 1 as described below. In comparison with the entangled nonwoven fabric made by a spun lace method in which the fibers are entangled with a high-pressure water jet, and the entangled nonwoven fabric made by a needle punch method in which the fibers are entangled by needling, the possibility that entanglements between the fibers will come loose because of the tension applied in the production steps of the sliding member 1 is reduced.

Moreover, if the nonwoven fabric made by the thermal bonding method is used as the substrate 2, it is preferable that fused bonding points between the fibers are not formed into films. By using the nonwoven fabric in which the fused bonding points between the fibers are not formed into films as the substrate 2, an anchor effect between the fibers and the base resin 3 is satisfactorily exhibited over the entire substrate 2, and the adhesion between the base resin 3 and the substrate 2 is improved so that exfoliation of the base resin 3 from the substrate 2 can be prevented.

Moreover, for the nonwoven fabric as the substrate 2, low-cost PET fibers are used.

As the base resin 3, phenol which exhibits a high affinity for the PET fiber is preferred, and furthermore PTFE powder may be added. Although the nonwoven fabric consisting of the PET fibers is used as the substrate 2 as described above, the PET fiber is inferior in lubricating properties to the PTFE fiber. Lubricating properties of the sliding member 1 is improved by adding the PTFE powder which is less expensive than the PTFE fiber to the base resin 3, according to lubricating properties required for the sliding member 1.

It should be noted that, in addition to the PTFE powder, a chelating agent which increases crosslinking points with hydroxyl groups (OH) of the phenol resin may be added to the phenol resin used as the base resin 3. As the chelating agent, titanium chelate represented by the following Chemical Formula 1 is used, for example. The titanium chelate reacts with the hydroxyl groups of the phenol resin to form crosslinking points comprising O—Ti—O bonds. Hardness of the base resin 3 becomes higher because of the increase in the crosslinking points, and water repellency becomes higher because of the decrease in the hydroxyl groups, so that wear resistance is improved and dimensional changes by swelling because of moisture absorption of the base resin 3 under high moisture environment is suppressed.

Chemical Formula 1

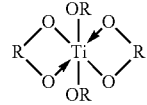

Figure 2:
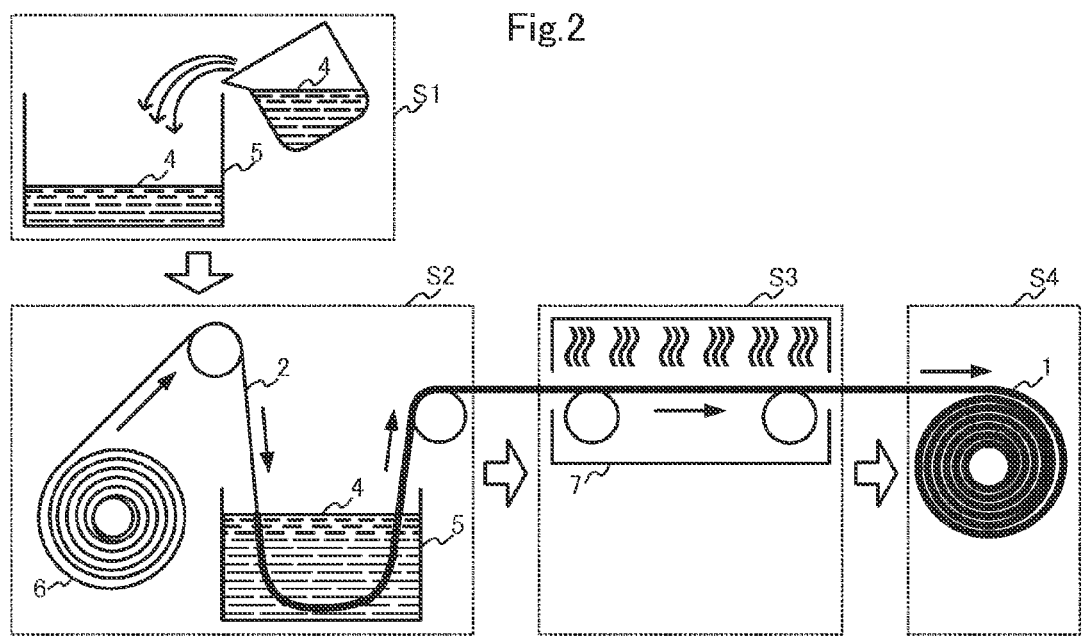
FIG. 2 is a view for explaining an example of steps for producing the sliding member 1.

FIG. 2 is a view for explaining an example of the production steps of the sliding member 1.

First, an additive comprising the PTFE powder and the chelating agent is added to the phenol resin to prepare a resin liquid 4 constituting the base resin 3 and then the resin liquid 4 is supplied to a liquid tank 5 (S1). A compounding ratio (mass) of each component constituting the resin liquid 4 is, for example, the PTFE powder of 20-70, the titanium chelate (chelating agent) of 0.5-10, a surfactant of 0.01-0.03 and ethanol of 20 with respect to the phenol resin of 100.

Next, the nonwoven fabric consisting of the PET fibers for the substrate 2 is drawn from a nonwoven fabric roll 6, conveyed to the liquid tank 5, and then immersed with the resin liquid 4 in the liquid tank 5 to impregnate the nonwoven fabric with the resin liquid 4 (S2). Then, the nonwoven fabric impregnated with the resin liquid 4 is conveyed to a drying furnace 7 kept at high temperature of around 100-130 degree Centigrade to evaporate the ethanol in the resin liquid 4 and to thermal cure the resin liquid 4 (S3). As a result, the sliding member 1 with the above configuration is made, for example, so as to contain the substrate 2 of 10-50 mass % and the base resin 3 of 50-90 mass %. Finally, the completed sliding member 1 is wound around a roll (S4).

As described above, the sliding member 1 according to the present embodiment is used for example as the prepreg constituting the sliding layer in the sliding bearing. In this case, the prepreg is wound around an iron core under high temperature of 100-160 degree Centigrade with a rolled molding machine, and then is heated to 130-180 degree Centigrade in a curing furnace for curing treatment. Then, the iron core is pulled off to make a cylindrical multilayered sliding member (rolled molding method). Alternatively, the prepreg is cut in appropriate dimensions and pluralities of pieces thereof are overlapped. Then, they are pressurized with a compression molding machine to make a plate-like multilayered sliding member (compression molding method).

The inventors made flat specimens (flat plates) 8A-8D from a plurality of sliding members with different substrates. And the inventors carried out a thrust test on the specimens 8A-8D under conditions shown in the following Table 1 to observe wear states at that time.

TABLE 1

| Test environment | In the air | In the water |
|---|---|---|
| Specimen | Shape: flat plate (length about 30 mm, width about 30 mm, thickness about 5 mm) | |
| Opposite material | Material: chromium-nickel based stainless steel (SUS304) | |
| | Shape: cylinder (inner diameter 20 mm, outer diameter 25.6 mm, length 30 mm) | |
| | For only those used in water, a cross groove of 3 mm width is formed on the sliding surface. | |
| | Surface roughness Ra: about 0.10 μm | |
| Rotational speed | about 0.5 mm/min | |
| Surface pressure | about 250 kgf/cm$^2$ | |
| Test time | about 20 hours | |

Figure 3:
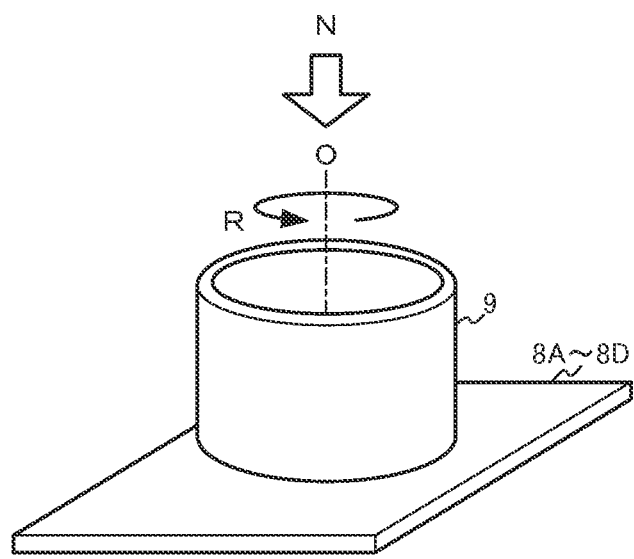
FIG. 3 is a view for explaining a thrust test.

In the thrust test, as shown in FIG. 3, an opposite member 9 rotates in a rotational direction R around the axis O at a rotational speed shown in Table 1, while a load N along an axis O direction is added to the opposite member 9 so that the specimens 8A-8D are pushed with one end surface (sliding surface) of the opposite member 9 by a surface pressure shown in Table 1. Meantime, a wear amount and presence or absence of surface exfoliation of the specimens 8A-8D are measured.

The prepared specimens 8A-8D are shown in the following Table 2. The specimens 8B-8D were made from the sliding member 1 according to the present embodiment, and the nonwoven fabric made by the thermal bonding method was used as the substrate 2. The specimen 8A is a comparative example for confirming performance of the sliding member 1 according to the present embodiment and the woven fabric was used as the substrate 2.

In all specimens 8A-8D, the phenol resin added with the PTFE powder was used as the base resin 3. In the specimens 8A-8C, the compounding ratio (mass) was the PTFE powder of 50 with respect to the phenol resin of 100. In the specimen 8D, the titanium chelate was further added to the base resin 3, and the compounding ratio (mass) were the PTFE powder of 50 and the titanium chelate of 5 with respect to the phenol resin of 100.

TABLE 2

| Specimen | | 8A (Comparative example) | 8B | 8C | 8D |
|---|---|---|---|---|---|
| Substrate | Type | Woven fabric | Nonwoven fabric | | |
| | Production method | | Thermal bonding method (with film formation) | Thermal bonding method (without film formation) | |
| | Material | | PET | | |
| Base resin | | | Phenol resin (100) PTFE powder (50) | | Phenol resin (100) PTFE powder (50) Chelate agent (5) |

It should be noted that in Table 2, decisions of presence or absence of film formation in the nonwoven fabrics were performed by an observation with a scanning electron microscope, and it was determined that film formation occurred when it was found that a flat region of approximately 500 µm square was formed in a fused bonding point.

Figure 4:
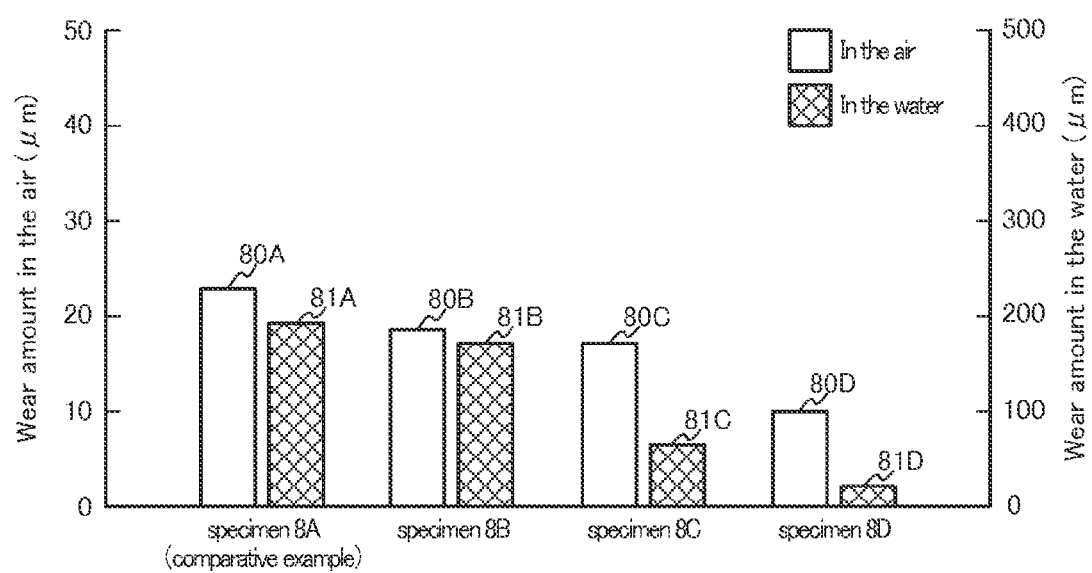
FIG. 4 is a view showing test results of the thrust test carried out on specimens 8A-8D shown in Table 2 under conditions shown in Table 1.

FIG. 4 is a view showing test results of the thrust test carried out on the specimens 8A-8D shown in Table 2 under the conditions shown in Table 1. A left vertical axis shows a wear amount in the air and a right vertical axis shows a wear amount in the water. Bar graphs 80A-80D show test results of a wear amount in the air of the specimens 8A-8D, and bar graphs 81A-81D show test results of a wear amount in the water of the specimens 8A-8D.

As shown in the figure, each specimen 8B-8D in which the nonwoven fabric was used as the substrate 2 exhibited a smaller wear amount in the air than the specimen 8A of the comparative example in which the woven fabric was used as the substrate 2, and consequently it was confirmed that the specimens 8B-8D exhibited superior performance in the air. It is considered that, on the sliding surfaces, fuzz and roughness surface observed in the woven fabric was changed into a uniformly smooth surface by using the nonwoven fabric so that wear resistance was improved.

In the water, although the specimen 8B had improved wear resistance in comparison with the specimen 8A of the comparative example, surface exfoliation was observed on the sliding surface. On the other hand, each specimen 8C, 8D exhibited superior wear resistance to the specimen 8A of the comparative example and also surface exfoliation was not observed on the sliding surface. Although the nonwoven fabric consisting of the PET fibers made by the thermal bonding method is used as the substrate 1 in each specimen 8B-8D, the nonwoven fabric in the specimen 8B has fused bonding points which are formed into films, while the nonwoven fabric in the specimens 8c, 8d has fused bonding points which are not formed into films. Thus, it is considered that, in the specimens 8C, 8D, the adhesion between the substrate 2 and the base resin 3 was improved, so that the wear resistance was improved. Meanwhile, it is considered that, in the specimen 8B, because of the film formation in the fused bonding points on the nonwoven fabric, the fused bonding points were smoothed and the anchor effect to the base resin 3 was decreased, so that the base resin 3 was easily separated from the substrate 2.

The reason that the wear resistance in the water was improved in each specimen 8B-8D in comparison with the specimen 8A of the comparative example is considered as follows. Since the nonwoven fabric has no stitches of the twist yarn and has the fibers uniformly dispersed, the sliding surface becomes more smoothly than the woven fabric, so that the fluid lubrication is facilitated.

Furthermore, the specimen 8D exhibited improved wear resistance in comparison with the specimen 8C, with respect to the wear amounts in both of the air and the water. Difference in the configuration between the specimen 8C and the specimen 8D is whether the titanium chelate is added to the base resin 3. In the specimen 8D, it is considered as follows. The titanium chelate which is added to the base resin 3 reacted with hydroxyl groups of the phenol resin as the base resin 3, so that crosslinking points increased. By this, hardness of the base resin 3 became higher and the wear resistance in the air was improved. Further, water repellency became higher because of a decrease in the hydroxyl groups, and the dimensional changes by swelling because of the moisture absorption of the base resin 3 in the water were suppressed, so that the wear resistance under environment in the water was also improved.

Furthermore, the inventors carried out a bend test on the specimens 8C, 8D shown in Table 2.

Figure 5:
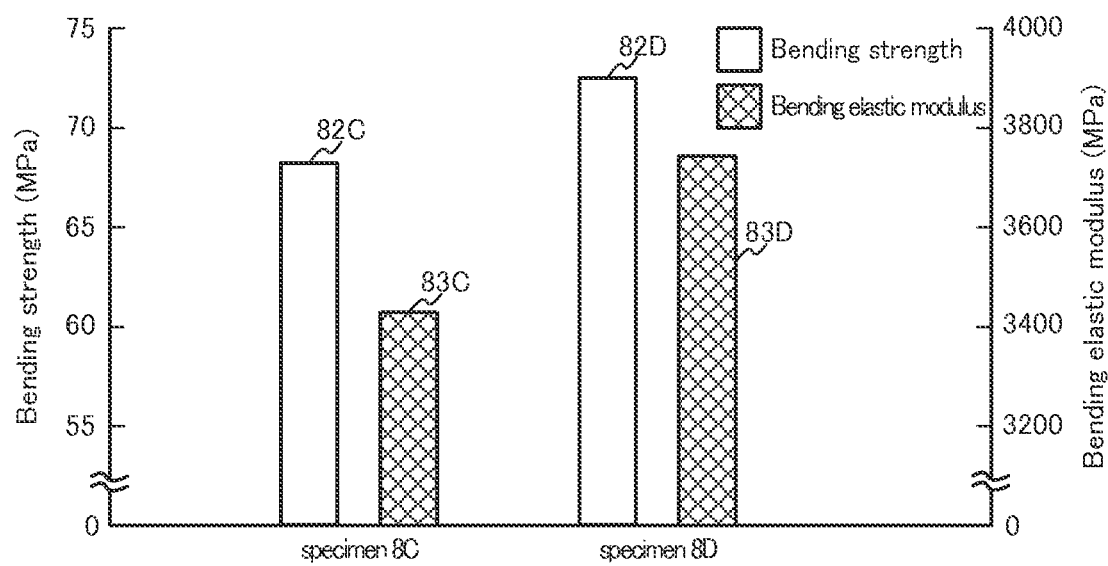
FIG. 5 is a view showing test results of a bend test carried out on the specimens 8C, 8D shown in Table 2.

FIG. 5 is a view showing test results of the bend test carried out on the specimens 8C, 8D shown in Table 2. A left vertical axis shows bending strength and a right vertical axis shows a bending elastic modulus. Bar graphs 82C, 82D show test results of bending strength of the specimens 8C, 8D, and bar graphs 83C, 83D show test results of bending elastic modulus of the specimens 8C 8D.

As shown in the figure, the specimen 8D in which the titanium chelate was added to the base resin 3 exhibited higher bending strength and higher bending elastic modulus, in comparison with the specimen 8C in which the titanium chelate was not added to the base resin 3. By adding the titanium chelate to the phenol resin as the base resin 3 like the specimen 8D, the hardness of the base resin 3 becomes higher. It is considered that contributes to the improvement of the wear resistance.

From the above, the inventors have found that, by using the nonwoven fabric as the substrate 2, adhesive strength between the substrate 2 and the base resin 3 is improved, so that the wear resistance is improved, in comparison with the case of using the woven fabric as the substrate 2. Moreover, the inventors have found that, by using the nonwoven fabric in which the fused bonding points are not formed into films, as the substrate 2, the exfoliation of the base resin 3 from the substrate 2 is prevented, so that a life of the sliding member 1 is improved. Furthermore, the inventors have found that, by adding the titanium chelate to the phenol resin as the base resin 3, the hardness and the water repellency of the base resin 3 become higher and the wear resistance in the air is improved. In addition, the swelling because of the moisture absorption under environment in the water is inhibited, so that the dimensional changes are prevented, and the wear resistance in the water is improved.

The embodiment of the present invention has been described above.

Since the nonwoven fabric is made by adhering or entangling the fibers, the production cost is lower than that of the woven fabric in which it is necessary to make the twist yarn from fibers and to weave the fabric from the twist yarn.

Moreover, if the woven fabric is used as the substrate, the base resin hardly penetrates into a center of the twist yarn constituting the woven fabric, so that the base resin and the substrate cannot be firmly adhered together. In contrast, the nonwoven fabric has no stitches and has the fibers uniformly dispersed in the nonwoven fabric. Therefore, each fiber becomes entangled in the base resin, so that the sliding properties such as wear resistance and durability are improved by improving adhesiveness between the substrate and the base resin and the strength of the sliding member. Furthermore, unlike the case that the woven fabric is used, fuzz of the twist yarn does not occur after processing. Therefore, a surface of the sliding member can be more smoothed, so that fluid lubrication is facilitated and the sliding properties in the liquid such as under water environment are also improved. These effects become more remarkable by using the nonwoven fabric in which the fused bonding points are not formed into films.

Therefore, according to the present embodiment, by using the nonwoven fabric as the substrate of the sliding member, the sliding member which can keep sliding properties including low friction properties, wear resistance and durability over a long period can be provided at a lower cost, in comparison with the case that the woven fabric is used.

Moreover, in the present embodiment, if the bonded nonwoven fabric made by the thermal bonding method, the binder method or the like is used as the substrate 2, unlike the entangled nonwoven fabric made by the spun lace method, the needle punch method or the like, the possibility of undoing the entanglements between the fibers in the steps for producing the sliding member 1 because of the tension applied to the substrate 2 is reduced. Therefore, yields in the steps for producing the sliding member 1 can be improved.

Moreover, in the present embodiment, if the nonwoven fabric made by the thermal bonding method and having the fused bonding points between the fibers which are not formed into films is used as the substrate 2, adhesion strength is improved because of a higher anchor effect to the base resin 3, in comparison with the case when the nonwoven fabric made by the thermal bonding method and having the fused bonding points between the fibers which are formed into films is used as the substrate 2. And the possibility of separating the base resin 3 from the substrate 2 is reduced, so that the life of the sliding member 1 can be extended.

Moreover, in the present embodiment, the nonwoven fabric consisting of the PET fibers is used as the substrate 2 of the sliding member 1. Since the PET fiber is less expensive than the PTFE fiber and exhibits a high affinity for the phenol resin used as the base resin 3, it is not necessary to mix PA fibers or the like. Thus, the nonwoven fabric can be made at a lower cost, so that the cost of the sliding member 1 can be more reduced.

Moreover, in the present embodiment, by using the base resin 3 in which the chelating agent which can increase the crosslinking points with hydroxyl groups of the phenol resin is added, the hardness becomes higher because of the increase in the crosslinking points and the water repellency becomes higher because of the decrease in the hydroxyl groups, so that the dimensional changes by swelling because of the moisture absorption of the phenol resin, in particular under high moisture environment, can be suppressed. Therefore, the sliding member 1 which can keep sliding properties including low friction properties, wear resistance and durability over a long period even under environment in the liquid such as environment in the water can be provided.

In the present embodiment, if the phenol resin added with the chelating agent which can increase the crosslinking points with hydroxyl groups of the phenol resin is used as the base resin 3 of the sliding member 1, the woven fabric may be used as the substrate 2. In this case, because of hardness improvement and water repellency improvement of the base resin 3, the sliding member 1 which can keep the sliding properties over a long period under environment in the liquid such as environment in the water can be also provided.

INDUSTRIAL APPLICABILITY

The present invention is applicable to a sliding layer of a sliding bearing or the like.

REFERENCE NUMERALS 1 sliding member
2 substrate
3 base resin
4 resin liquid
5 liquid tank
6 nonwoven fabric roll
7 drying furnace

The invention claimed is:
1. A sliding member comprising:
a substrate; and
a base resin consisting of a phenol resin impregnated into the substrate, wherein:
the substrate is a nonwoven fabric consisting of polyethylene terephthalate fibers; and
a chelating agent which increases crosslinking points with hydroxyl groups of the phenol resin is added to the base resin.
2. The sliding member according to claim 1, wherein:
the substrate is a bonded nonwoven fabric made by a thermal bonding method or a binder method.
3. The sliding member according to claim 2, wherein:
fused bonding points of the bonded nonwoven fabric made by the thermal bonding method are not formed into films.
4. The sliding member according to claim 3, wherein:
the chelating agent is a titanium chelate.
5. The sliding member according to claim 2, wherein:
the chelating agent is a titanium chelate.
6. The sliding member according to claim 1, wherein:
the substrate is an entangled nonwoven fabric made by a spun lace method or a needle punch method.
7. The sliding member according to claim 6, wherein:
the chelating agent is a titanium chelate.
8. The sliding member according to claim 1, wherein:
the chelating agent is a titanium chelate.
9. A sliding member comprising:
a substrate; and
a base resin consisting of a phenol resin impregnated into the substrate, wherein:
the substrate is a woven fabric consisting of polyethylene terephthalate fibers; and
a chelating agent which increases crosslinking points with hydroxyl groups of the phenol resin is added to the base resin.
10. The sliding member according to claim 9, wherein:
the chelating agent is a titanium chelate.

* * * * *